US011531715B2

(12) United States Patent
Mathews

(10) Patent No.: US 11,531,715 B2
(45) Date of Patent: *Dec. 20, 2022

(54) SYSTEMS AND METHODS FOR SINGLE PAGE APPLICATION SERVER-SIDE RENDERER

(71) Applicant: Capital One Services, LLC, McLean, VA (US)

(72) Inventor: Liju Mathews, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/992,696

(22) Filed: Aug. 13, 2020

(65) Prior Publication Data

US 2020/0372086 A1 Nov. 26, 2020

Related U.S. Application Data

(63) Continuation of application No. 15/937,242, filed on Mar. 27, 2018, now Pat. No. 10,747,828.

(51) Int. Cl.
G06F 16/00 (2019.01)
G06F 16/951 (2019.01)
G06F 16/955 (2019.01)
G06F 16/957 (2019.01)

(52) U.S. Cl.
CPC ........ G06F 16/951 (2019.01); G06F 16/9566 (2019.01); G06F 16/9577 (2019.01)

(58) Field of Classification Search
CPC . G06F 16/951; G06F 16/9566; G06F 16/9577
See application file for complete search history.

(56) References Cited

U.S. PATENT DOCUMENTS 9,436,763 B1* 9/2016 Gianos ................. G06F 16/958
2014/0372515 A1* 12/2014 Chow ................. G06F 16/9574
709/203

FOREIGN PATENT DOCUMENTS

CN 105912693 A * 8/2016 ........... G06F 16/951

OTHER PUBLICATIONS

Konshin, kirill, "Next. JS Quick Start Guide (Server-side rendering done right)", Jul. 2018; Packet Publishing Ltd, pp. 6-34.*

* cited by examiner

Primary Examiner — Dinku W Gebresenbet
(74) Attorney, Agent, or Firm — Perkins Coie LLP

(57) ABSTRACT

In certain embodiments, single-page application server-side rendering may be facilitated. In some embodiments, a request related to a single-page web application may be obtained. A determination of whether the request is a crawler request may be effectuated. In response to determining that the request is a crawler request, a server-side renderer may generate a static page in connection with the request from the crawler. In some embodiments, web assets may be obtained from one or more databases via the server-side renderer, and the server-side renderer may generate the static page based on the web assets. The static page may then be provided as a response to the request.

20 Claims, 7 Drawing Sheets

SYSTEMS AND METHODS FOR SINGLE PAGE APPLICATION SERVER-SIDE RENDERER

CROSS-REFERENCE TO RELATED APPLICATION

This application is a continuation of U.S. patent application Ser. No. 15/937,242, filed Mar. 27, 2018. The content of the foregoing application is incorporated herein in its entirety by reference.

TECHNICAL FIELD

This disclosure relates generally to search engine optimization, and more particularly to systems and methods for single page application server-side Tenderers.

BACKGROUND

The World Wide Web originally evolved primarily as a large collection of static web pages. Static web pages are pages that a server delivers to a user's web browser exactly as stored. Search engines are software systems that allow a user to search for information on the Internet. Search engines, for example, periodically update their index of web pages stored across the Internet, and/or update their web content (e.g., for faster retrieval and delivery to a user's web browser). Often, they do this using web crawlers or spiders. Search engine crawlers are software applications that systematically browse Internet sites in automated fashion to update the search engine's index or database of web content. For example, a search engine crawler may download a copy of a static web page, and then the search engine may process the static web page to update its search index. Search engine crawlers were originally designed to crawl static HTML content of web pages.

The inventor here has recognized several technical problems with such conventional systems, as explained below. As the web has evolved, so have the technologies powering websites, as well as the mechanisms of delivering and presenting web content to a user's web browser. For example, AJAX, short for "Asynchronous JavaScript+ XML," allows for asynchronous operations on the web (some implementations use the JSON data format instead of XML). For example, with AJAX, a web application running in a user's web browser can send and retrieve data from a web server asynchronously from the display and behavior of the existing web page. Thus, unlike with static web pages, where to change any of the content displayed to a user an entirely new static web page must be loaded into the web browser, with AJAX and web applications, the content (or view) displayed to a user can be changed without the need to reload an entirely new page. Single page web applications can take this concept to where only one HTML page is loaded into the web browser, and this page is fed partial views asynchronously. For example, when using the AngularJS front-end web application framework, a single-page web application may be running within the user's web browser, and all data-binding, routing, and application logic may be done on the client-side.

But because search engine crawlers are designed to operate on static HTML content, not dynamic single-page web applications, they are unable to accurately crawl content from websites that deliver web content through such single page applications. For example, in such an instance, the search engine crawler may simply download a blank start page, which the search engine cannot use for indexing the dynamically served web content available at the website.

A rudimentary solution to this problem involves running an application (e.g., Prerender.io) on the web server that takes the server's dynamically served web content and converts it en masse into individual cached static pages, which are then delivered in response to search engine crawler requests. This approach creates at least two problems of its own. First, the rendering application takes up a large amount of time and server resources to convert the server's dynamically served web content en masse into individual cached static web pages. Second, if the server's content itself changes dynamically, for example, faster than the rendering application can convert the content into cached static web pages, then the cached static web pages do not accurately represent the dynamically served web content of the server. Other problems include delay in caching a large amount of dynamically served web content, and costs associated with such rendering services.

SUMMARY

Embodiments of the present disclosure present technological improvements as solutions to one or more of the above-mentioned technical problems recognized by the inventor in conventional systems. For example, some embodiments may implement a single-page application server-side renderer that can dynamically render individual static web pages on demand in response to search engine crawler requests.

In some embodiments, a request related to a single-page web application may be obtained. A determination of whether the request is a crawler request may be effectuated. In response to determining that the request is a crawler request, a server-side renderer may generate a static page in connection with the request from the crawler. In some embodiments, web assets may be obtained from one or more databases via the server-side renderer, and the server-side renderer may generate the static page based on the web assets. The static page may then be provided as a response to the request.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
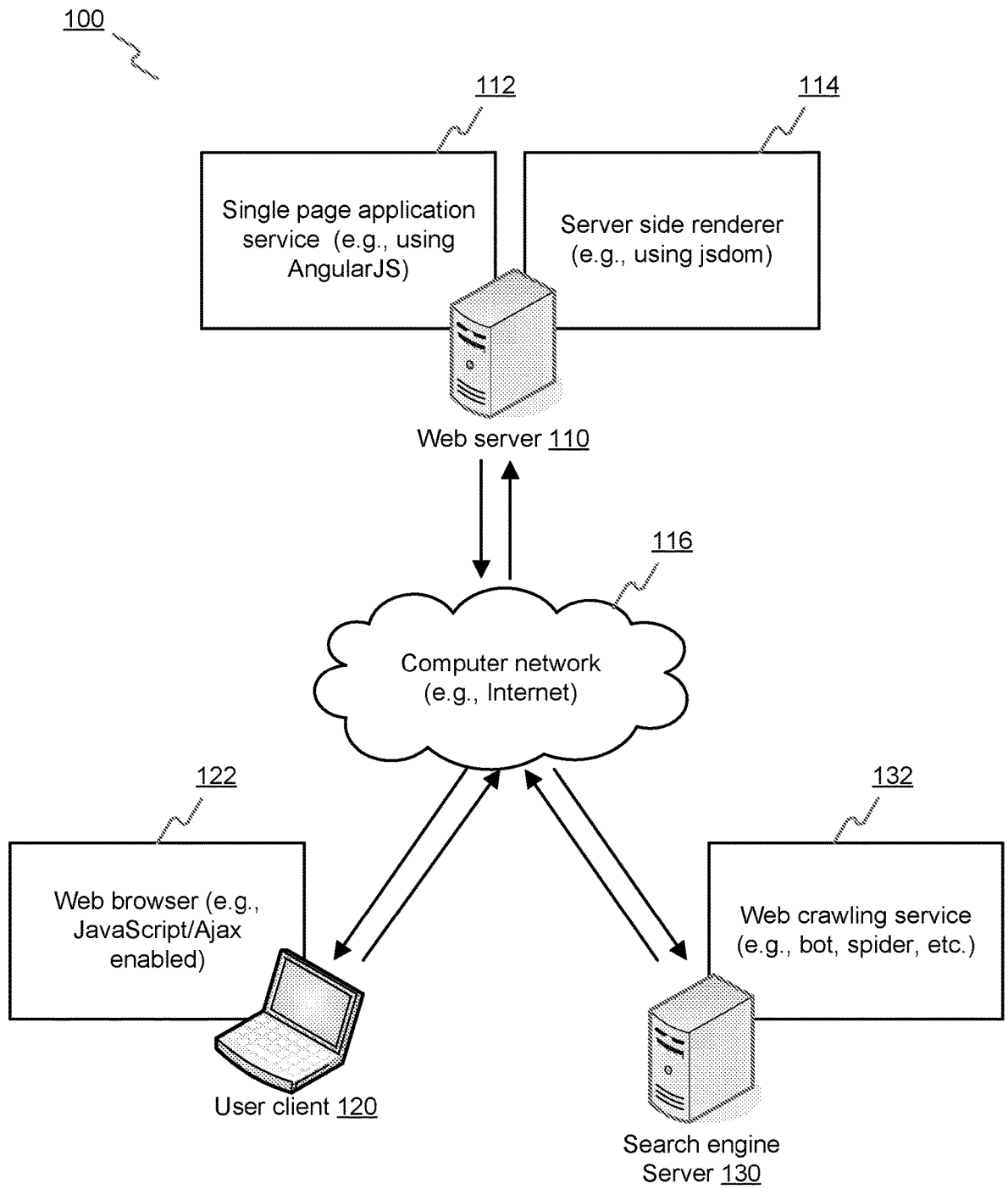
FIG. 1 illustrates an example system for implementing a single page application server-side renderer.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

FIG. 1 illustrates an example system 100 for implementing a single page application server-side renderer. The features and other aspects and principles of the disclosed embodiments may be implemented in various environments. Such environments and related applications may be specifically constructed for performing the various processes and operations of the disclosed embodiments or they may include computing platforms selectively activated or reconfigured by program code to provide the necessary functionality. The processes disclosed herein may be implemented by a suitable combination of hardware, software, and/or firmware. For example, the disclosed embodiments may implement computing platforms that may be configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by computing platforms as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

As shown in FIG. 1, system 100 includes a web server 110, a user client 120, a search engine server 130, and a computer network 116. In some embodiments, user client 120 may be a personal computing device such as a desktop computer, laptop computer, notebook, mobile device, smartphone, tablet computer, or gaming console. User client 120 may include a web browser 122. The web browser 122 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browser 122 may utilize facilities such as AJAX, DHTML, Adobe Flash, JavaScript, Java, application programming interfaces (APIs), etc. Web browser 122 may communicate with a single page application service 112 implemented on web server 110 via computer network 116.

In some embodiments, computer network 116 may be any type of network that facilitates communications and data transfer between components of the system environment, such as, for example, web server 110, user client 120, and search engine server 130. Computer network 116 may be a Local Area Network (LAN), a Wide Area Network (WAN), such as the Internet, and may be a single network or a combination of networks. Further, computer network 116 may include a single type of network or a combination of different types of networks, such as the Internet and public exchange networks for wire-line and/or wireless communications. Computer network 116 may use cloud-computing technologies that are familiar in the marketplace. Computer network 116 is not limited to the above examples and the system may implement any type of network that allows the entities (and others not shown) included in FIG. 1 to exchange data and information.

In some embodiments, web server 110 may deliver dynamically generated web content to web browser 122 running on user client 120 using a single page application service 112. For example, web server 110 may utilize the Angular.js front-end web application framework to provide a single page application service for web browser 122. Web server 110 may obtain dynamic web content to serve via the single page application service from one or more databases (not shown in FIG. 1). Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

In some embodiments, search engine server 130 may be associated with a web search engine. The web search engine may allow users, like a user of user client 120, to search for information on the computer network 116, including information hosted by web server 110. The web search engine may, for example, periodically update its index of web pages stored across the computer network 116, and/or update its web content (e.g., for faster retrieval and delivery to web browser 122). Search engine server 130 may implement a web crawling service 132, e.g., a search bot or spider. Web crawling service 132 may be a software application that systematically browse sites hosted on computer network 116 (and/or web server 110) in automated fashion to update the search engine server 130's index or database of web content. For example, web crawling service 132 may download a copy of a static web page served by web server 110, and then the search engine server 130 may process the static web page to update its search index.

Web crawling service 132 may be designed to operate on static HTML content, not dynamic single-page web applications, and may ordinarily be unable to accurately crawl content from web server 110 that delivers web content through single page application service 112. For example, in such an instance, web crawling service 132 may simply download a blank start page, which the search engine server 130 cannot use for indexing the dynamically served web content available at web server 110. Accordingly, in some embodiments, web server 110 may implement a server-side renderer 114 to dynamically render individual static web pages on demand (e.g., in real-time) in response to web crawling service 132's requests. For example, server-side Tenderer 114 may be a node.js application that utilizes the jsdom JavaScript implementation of WHATWG DOM and HTML standards to process and render a single page application (paralleling a web application running in web browser 122 on user client 120). The node.js application may communicate with single page application service 112 to render and cache compiled HTML web pages for serving on demand, e.g., in real-time, in response to web crawling service 132's requests.

Figure 2:
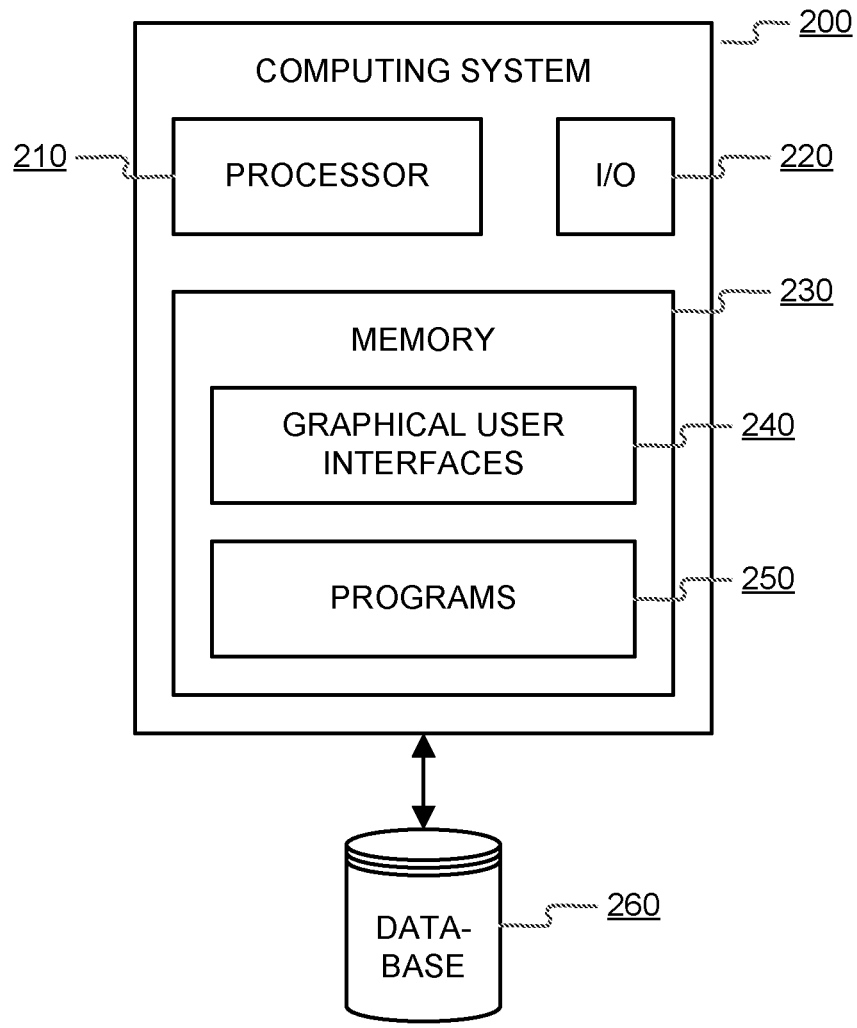
FIG. 2 is a block diagram of an exemplary computing environment for implementing a single page application server-side renderer.

FIG. 2 is a block diagram of an exemplary computing environment for implementing a single page application server-side renderer. Computing system 200 may be associated with web server 110, user client 120, search engine server 130, or any of the devices included in computer network 116, consistent with disclosed embodiments. In one embodiment, computing system 200 may have one or more processors 210, one or more memories 230, and one or more input/output (I/O) devices 220. In some embodiments, computing system 200 may take the form of a server, general-purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 250 that may perform one or more operations when executed by processor 210. The disclosed embodiments are not limited to separate programs or computers configured to perform dedicated tasks. For example, memory 230 may include a program 250 that performs the functions of computing system 200, or program 250 could comprise multiple programs. Additionally, processor 210 may execute one or more programs located remotely from computing system 200. For example, user devices 110, devices within communication network 120, databases 130, and back-end servers 140, may, via computing system 200 (or variants thereof), access one or more remote programs that, when executed, perform functions related to certain disclosed embodiments. Processor 210 may further execute one or more programs located in database 260. In some embodiments, programs 250 may be stored in an external storage device, such as a cloud server located outside of computing system 200, and processor 210 may execute programs 250 remotely.

Programs executed by processor 210 may cause processor 210 to execute one or more processes related to implementing merchant business intelligence tools. Programs executed by processor 210 may further cause processor 210 to execute one or more processes related to statistical demographic analysis of customer information. Programs executed by processor 210 may also cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing ATM cash withdrawals, or the like. Programs executed by processor 210 may further cause processor 210 to execute one or more processes related to aggregating census data, consumer financial transaction data, user profile data, and merchant information.

Memory 230 may also store data reflecting any type of information in any format that the system may use to perform operations consistent with the disclosed embodiments. Memory 230 may store instructions to enable processor 210 to execute one or more applications, such as server applications, a customer data aggregation application, a customer demographic statistical analysis application, network communication processes, and any other type of application or software. Alternatively, the instructions, application programs, etc. may be stored in an external storage (not shown) in communication with computing system 200 via communication network 120 or any other suitable network. Memory 230 may be a volatile or non-volatile, magnetic, semiconductor, tape, optical, removable, non-removable, or other type of storage device or tangible (e.g., non-transitory) computer-readable medium.

Memory 230 may include graphical user interfaces ("GUI") 240. GUI 240 may allow a user to access, modify, etc. user profile information, user demographic information, merchant information, census information, merchant business intelligence tools, and/or the like. In certain aspects, as explained further below with reference to FIGS. 7-9, GUI 240 may facilitate an operator to view raw aggregated customer information, customer demographic information, visualizations of statistical analyses, merchant business intelligence tools, or the like. Additionally or alternatively, GUI 240 may be stored in database 260 or in an external storage (not shown) in communication with computing system 200 via networks 120 or any other suitable network.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components that provide interfaces to one or more input devices, such as one or more keyboards, mouse devices, and the like, which may enable computing system 200 to receive input from an operator of user device 110.

Computing system 200 may also comprise one or more database(s) 260. Alternatively, computing system 200 may be communicatively connected to one or more database(s) 260. Computing system 200 may be communicatively connected to database(s) 260 through network 120. Database 260 may include one or more memory devices that store information and are accessed and/or managed through computing system 200. By way of example, database(s) 260 may include Oracle™ databases, Sybase™ databases, or other relational databases or non-relational databases, such as Fladoop sequence files, FIBase, or Cassandra. The databases or other files may include, for example, data and information related to the source and destination of a network request, the data contained in the request, etc. Systems and methods of disclosed embodiments, however, are not limited to separate databases. Database 260 may include computing components (e.g., database management system, database server, etc.) configured to receive and process requests for data stored in memory devices of database(s) 260 and to provide data from database 260.

As discussed above, web server 110, user client 120, search engine server 130, or any of the devices included in computer network 116 may include at least one computing system 200. Computing system 200 may be a single server or may be configured as a distributed computer system including multiple servers or computers that intemperate to perform one or more of the processes and functionalities associated with the disclosed embodiments.

Figure 3:
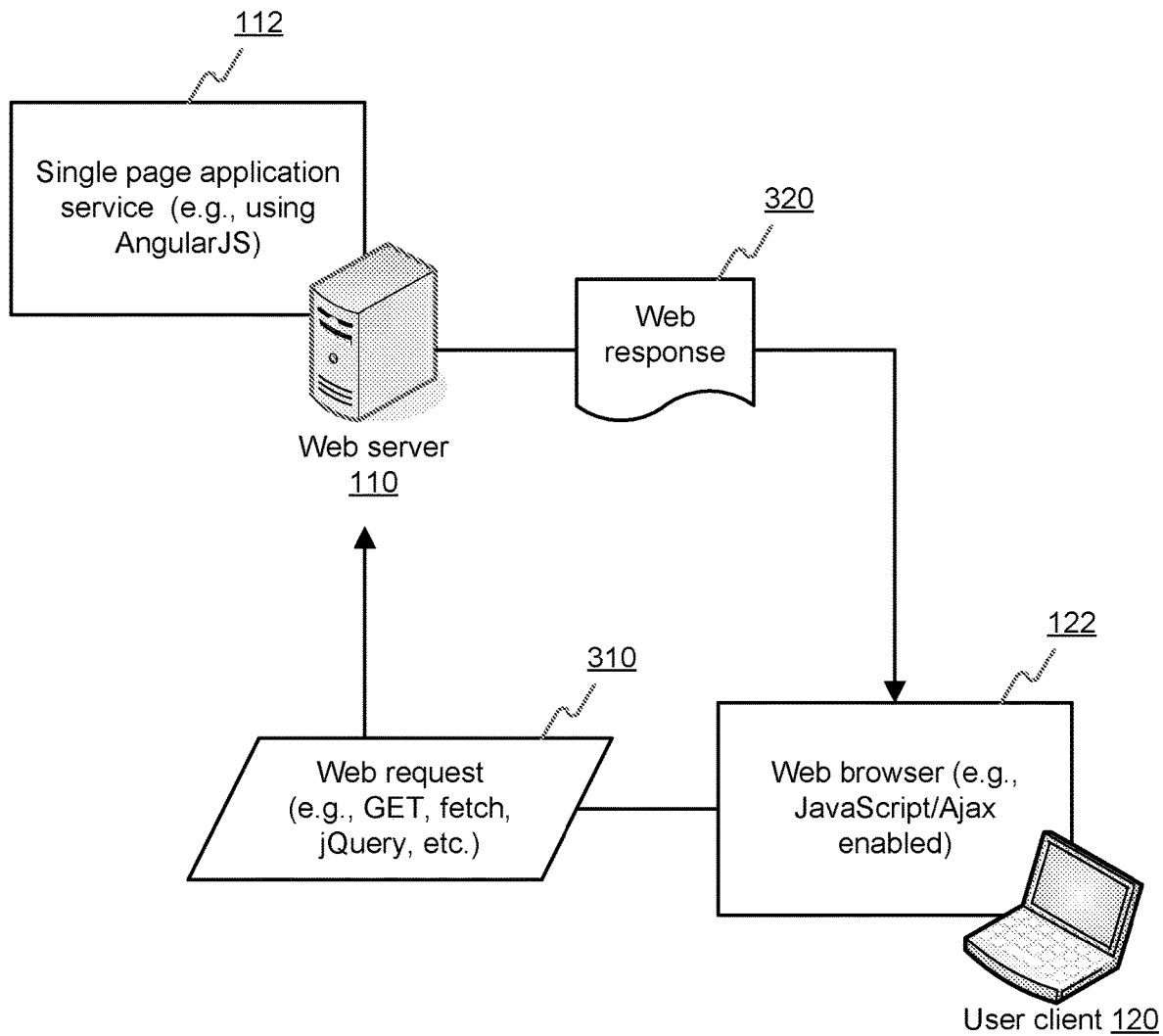
FIG. 3 is a block diagram illustrating interaction of a web server with a web browser of a user client.

FIG. 3 is a block diagram illustrating interaction of a web server with a web browser of a user client. In some embodiments, user client 120 may execute web browser 122, which may utilize facilities such as AJAX and JavaScript. Using such utilities, web browser 122 may serve web requests 310 to web server 110. For example, in response to web browser 122's request, web server 110 may utilize an AngularJS service to provide a single page application service 112. For example, as its web response 320, single page application service 112 may provide a single-page web application for running within the user's web browser, such that all data-binding, routing, and application logic may be performed within web browser 122 at user client 120. In response to additional web requests 310 from web browser 122, single page application service 112 may provide partial views as web responses 320 to web browser 122, which may then update its display and/or behavior asynchronously from the data interchange between web browser 122 and single page application service 112.

Figure 4:
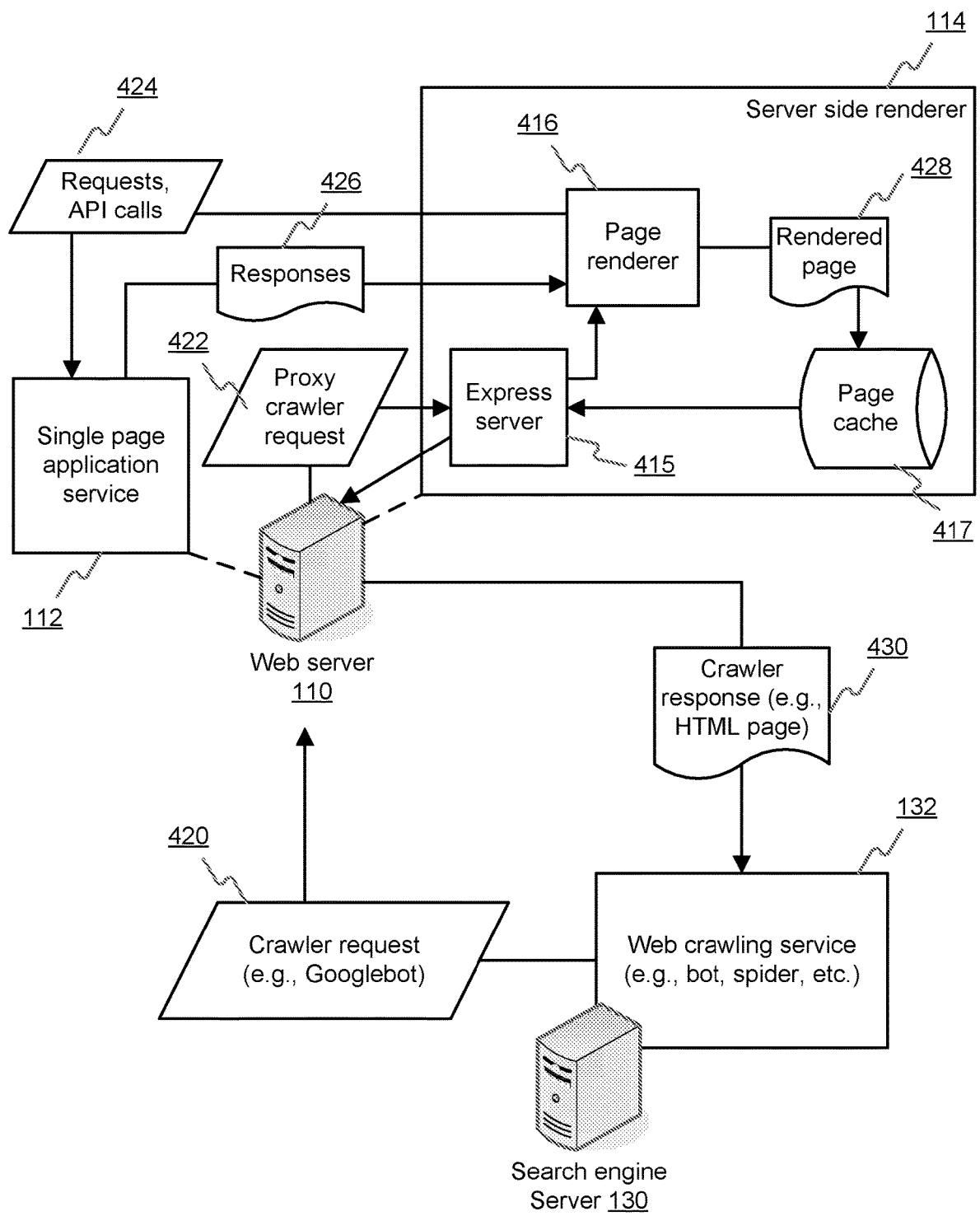
FIG. 4 is a block diagram illustrating interaction of a web server with a web crawling service of a search engine server.

FIG. 4 is a block diagram illustrating interaction of a web server with a web crawling service of a search engine server. In some embodiments, search engine server 130 may, as part of its operations for a web search engine, periodically update its index of web pages stored across the computer network 116, and/or update its web content, by using web crawling service 132. Web crawling service 132 may send crawler requests 420 to web server 110. For example, the crawler request 420 may be a request sent by Googlebot, a search bot software used by the Google search engine. Through crawler request 420, web crawling service 132 may request to download a copy of a static web page served by web server 110, for search engine server 130 to process to update its search index.

Web server 110 may determine that crawler request 420 is a web crawling request from a web crawling service 132 running on a search engine server 130, rather than a web request 310 from a web browser 122 running on a user client 120, and may process crawler request 420 differently than web request 310 (see FIG. 3). For example, web server 110 may determine that the request is from web crawling service 132, and that the request includes a uniform resource locator (URL) for a single page web application. Web server 110 may invoke server-side renderer 114 in response to the crawler request 420. Web server 110 may generate a proxy crawler request 422, and provide the proxy crawler request 422 to server-side renderer 114. Server-side renderer 114 may be implemented as a nodejs application utilizing jsdom to process the proxy crawler request 422. Server-side renderer 114 may invoke an express server 415 to coordinate operations of the various components of the server-side renderer 114. For example, express server 415 may invoke a page renderer 416 to render a static web page for caching or serving in response to proxy crawler request 422. Page renderer 416 may make requests or application programming interface ("API") calls 424 for web assets (e.g., HTML, images, ess, js files, etc.) from single page application service 112. Single page application service 112 may provide such requested web assets to page render 416 in its responses 426 to page render 416's requests and API calls 424. Using the received web assets, page renderer 416 may generate a rendered page 428, and store the rendered page in a page cache 417. In some embodiments, express server may retrieve a cached rendered page from page cache 417 for serving in response to proxy crawler request 422, or, in some embodiments, may directly serve a rendered page as soon as available in response to proxy crawler request 422. Web server 110, upon receiving a static web page in response to its proxy crawler request 422, may provide the received static web page as its crawler response 430 to web crawling service 132's crawler request 420.

Accordingly, in some embodiments, web server 110, using server-side renderer 114, may provide on-demand, real-time search engine optimizing web crawler responses that accurately reflect (e.g., in real-time) the dynamic web content that its single page application service 112 serves to user clients 120 via asynchronous single page web applications.

Figure 5A:
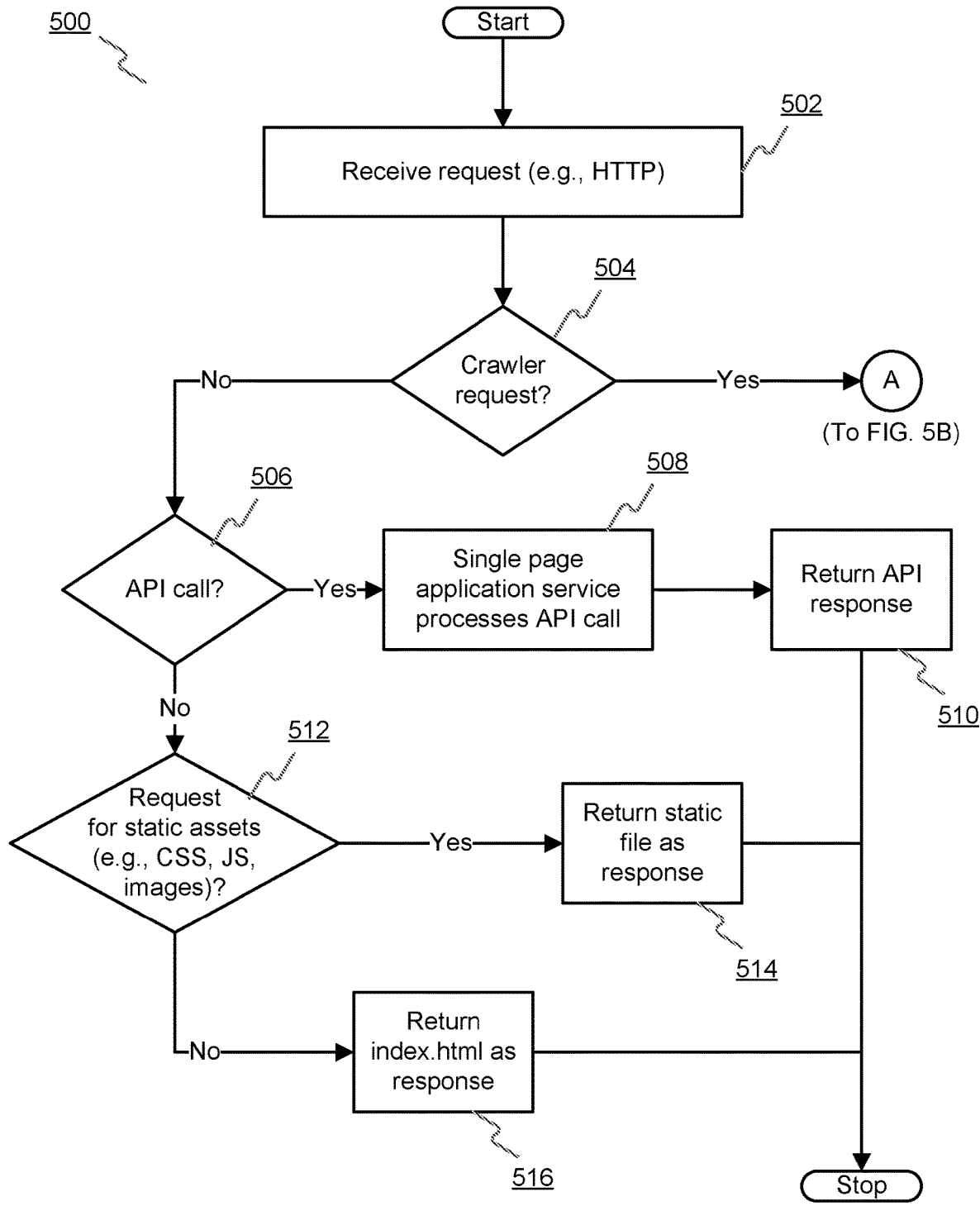
FIGS. 5A-C are flow diagrams illustrating a single-page application server-side renderer method for dynamically rendering individual static web pages on demand in response to search engine crawler requests.
Figure 5B:
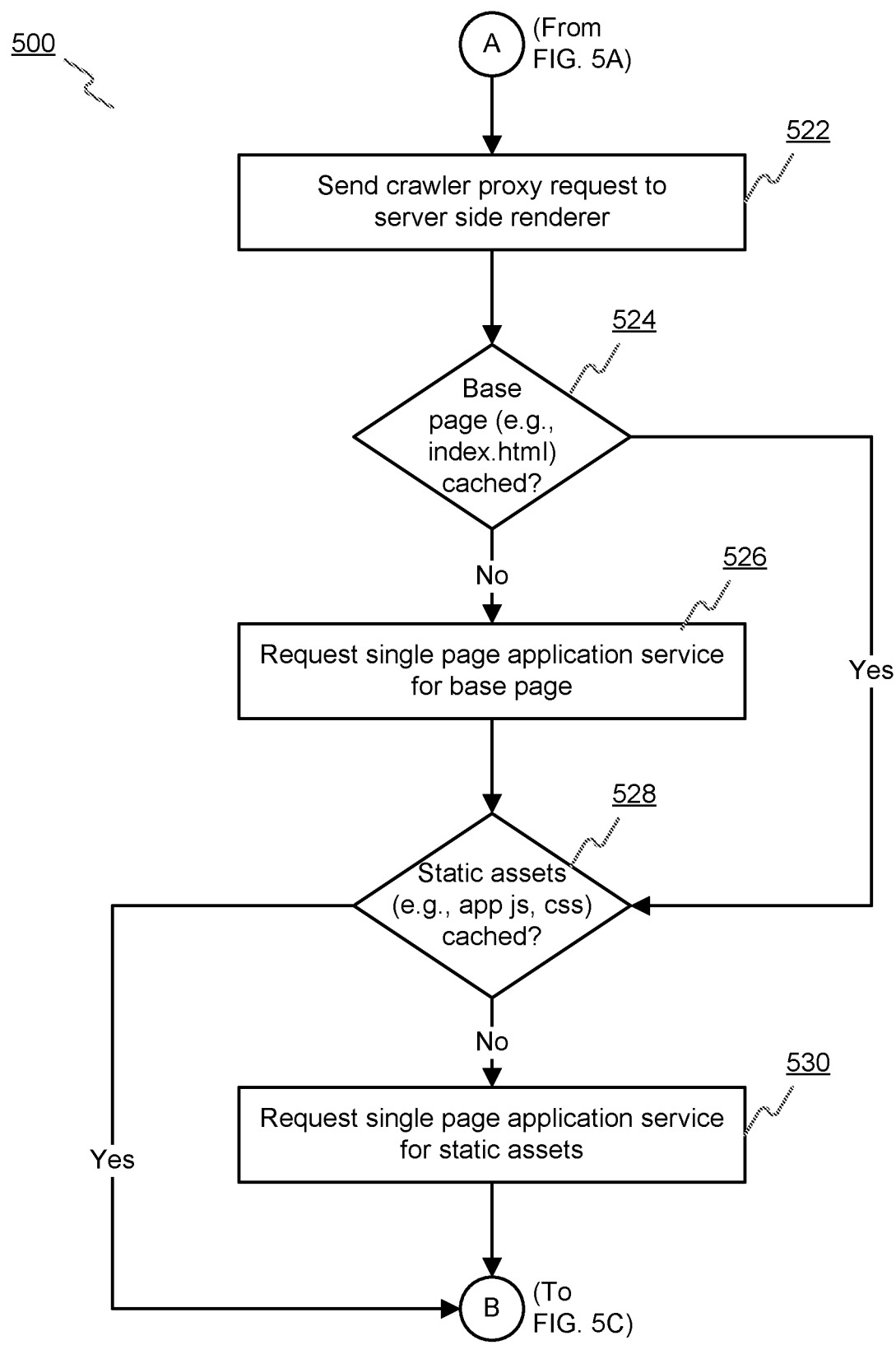
Figure 5C:
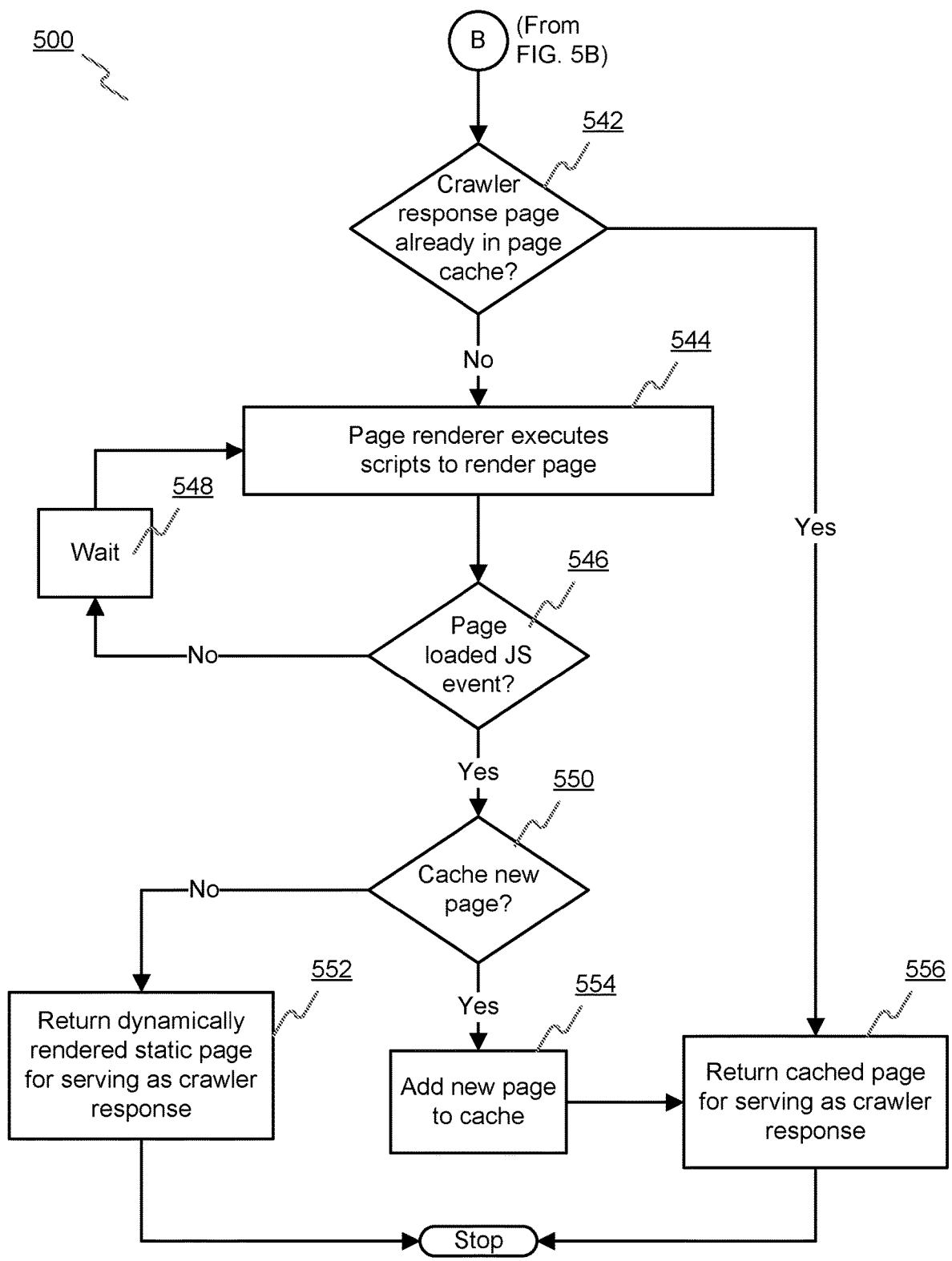

FIGS. 5A-C are flow diagrams illustrating a single-page application server-side renderer method for dynamically rendering individual static web pages on demand in response to search engine crawler requests. With reference to FIG. 5A, at step 502, web server 110 may receive a request from a user client 120 or a search engine server 130. As an example, the request may be formatted according to the HTTP protocol as a GET message. Web server 110 may extract header information from the request. Using the header information, web server 110 may determine a source of the request.

At step 504, if the web server 110 determines that the request is a web request 310 from a web browser 122 running on a user client 120, the web server 110 may process the request accordingly. For example, at step 506, if the web server 110 determines that the web request 310 is an API request, the web server may determine that a single page web application running in the web browser 122 has made the API request, and, at step 508, may invoke single page application service 112 to process the API call. At step 510, single page application service 112 may return an API response to the single page web application running in web browser 122. Returning to step 506, if the web server 110 determines that the web request 310 is not an API call, at step 512, the web server 110 may determine whether the web request 310 is a request for static assets (e.g., CSS sheets, .js files, images, etc.), for example via a HTTP GET request. If the web server 110 determines that the web request 310 is a request for static assets, at step 514, the web server 110 may return the requested static assets to the web browser 122, e.g., as part of a HTTP OK message, or after negotiating transfer of the assets via a different protocol with the web browser. Returning to step 512, if the web server 110 determines that the web request 310 is not a request for static assets. At step 516, the web server may return a standard start page (e.g., index.html) to the web browser 122.

Returning to step 504, if the web server 110 determines that the request is a search engine crawler request 420 from web crawling service 132 directed to a single page web application, web server 110 may process it differently than a web request 310 from web browser 122. For example, web server 110 may determine that the request is from web crawling service 132, and that the request includes a uniform resource locator (URL) for a single page web application.

With reference to FIG. 5B, at step 522, web server 110 may create a crawler proxy request 422 from the search engine crawler request 420, and, at step 522, provide the crawler proxy request 422 to express server 415 within server-side renderer 114. At step 524, express server 415 may determine whether the base page of the single page application is cached in page cache 417. If express server 415 determines that the base page is not cached, at step 526, express server may invoke page renderer 416, which may request 424 one or more web resources from single page application service 112 including, for example, the base page. Single page application service 112 may provide a response 426 with the web resources, including the base page, to page renderer 416. Once the base page is loaded into page renderer 416, at step 528, page renderer 416 may determine whether additional web resources, including static assets, that are needed to service the crawler proxy request 422 are cached in the page cache 417. If the page renderer 416 determines that the required web resources such as static assets are not cached, at step 530, page renderer 417 may request 424 the required web resources, including static assets (e.g., js files, CSS sheets, images, etc.), from single page application service 112 (e.g., via an API call), and single page application service 112 may provide a response 426 with the requested web resources (e.g., via an API call response) to page renderer 416.

With reference to FIG. 5C, at step 542, express server 415 may determine whether the crawler response page that is responsive to the crawler proxy request 422 is already cached in page cache 417. If express server 415 determines that the crawler response page is already cached in page cache 417, at step 556, express server 415 may retrieve the cached page from page cache 417, and return the cached page as the response to the crawler proxy request 422. Web server 110 may provide the cached page as crawler response 430 (e.g., a static HTML web page) to web crawling service 132 running on search engine server 130.

Returning to step 542, if express server 415 determines that the crawler response page is not cached in page cache 417, at step 544, page renderer 416 may execute scripts (e.g., JavaScript or similar script) to render a static (e.g., HTML) page. Page rendered 416 may use the web resources (e.g., base page, static assets) obtained from single page application service 112 to render the static page. In some embodiments, at step 546, express server 415 may periodically (or continuously) determine whether page renderer 416 has issued a page loaded JavaScript event, signifying, for example, completion of script execution and/or completion of rendering of the static page. If express server 415 determines that page renderer 416 has not issued a page loaded JavaScript event, at step 548, express server may wait until page renderer 416 completes processing the scripts to render the static page. Once express server 415 determines that page renderer 416 has issued a page loaded JavaScript event, at step 550, express server 415 may determine whether to cache the dynamically rendered static page. If, for example, the express server 415 determines that the dynamically rendered static page is one that is responsive to the crawler proxy request 422, at step 552, express server 415 may provide the dynamically rendered static page to web server 110 for serving as crawler response 430 to web crawling service 132. If, however, the express server 415 determines that the dynamically rendered static page is not one that is responsive to the crawler proxy request 422, or determines that the page needs to be cached as a current state of the page renderer 416 (e.g., for subsequent rendering operations), at step 554, express server 415 may add the new static page to page cache 417, and may return either the cached page or a previously cached page for serving as the crawler response 430. In some embodiments, express server 415 may invoke continued operation of page renderer 416 to create additional dynamically rendered static pages before deciding on a static page to provide as the as the crawler response 430. Further, in some embodiments, express server 415 may invoke page renderer 416 to produce multiple static pages and cache them in page cache 417 before deciding on a cached static page to provide for serving as the crawler response 430.

The specification has described systems and methods for single page application server-side Tenderers. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for facilitating single-page application server-side rendering, the system comprising:
a server system comprising one or more processors and memory storing program instructions that, when executed by the one or more processors, cause the server system to perform operations comprising:
in response to determining that a request from a crawler comprising a reference related to a single-page web application is a crawler request, causing a server-side renderer to generate a static page in connection with the request from the crawler by:
(i) obtaining, via the server-side renderer, web assets from one or more databases and
(ii) generating, via the server-side renderer, the static page based on the web assets;
providing, to the crawler, the static page as a first response to the request; and
in response to determining that a second request from a client device comprising a second reference related to the single-page web application is not a crawler request, providing the web assets to be received by the client device in lieu of causing the server-side renderer to generate a corresponding static page in connection with the second request from the client device, wherein the client device performs client-side rendering based on the web assets.

2. The system of claim 1, the operations further comprising:
extracting header information from the request,
wherein determining whether the request is a crawler request comprises determining whether the request is a crawler request based on the header information.

3. The system of claim 1, wherein obtaining the web assets comprises:
generating, via the server-side renderer, one or more application programming interface (API) calls for the web assets; and
obtaining, via the server-side render, the web assets from the one or more databases in response to the API calls.

4. The system of claim 1, wherein the server-side renderer is caused to generate the static page in response to (i) determining that the request is a crawler request and (ii) determining that the reference of the request is an uniform resource locator for the single-page web application.

5. The system of claim 1, wherein the client device performs client-side rendering based on the web assets to generate a start page different from the static page.

6. The system of claim 1, wherein generating the static page comprises:
obtaining a base page of the single-page web application; and
generating, via the server-side renderer, the static page based on the web assets and the base page of the single-page web application.

7. A method for facilitating single-page application server-side rendering, the method comprising:
in response to determining that a request from a crawler comprising a reference related to a single-page web application is a crawler request, causing a server-side renderer to generate a static page in connection with the request from the crawler by
(i) obtaining, via the server-side renderer, web assets from one or more databases and
(ii) generating, via the server-side renderer, the static page based on the web assets;
providing the static page as a response to the request; and
in response to determining that a second request from a client device comprising a second reference related to the single-page web application is not a crawler request, providing web assets to be received by the client device in lieu of causing the server-side renderer to generate a corresponding static page.

8. The method of claim 7, further comprising:
extracting header information from the request,
wherein determining whether the request is a crawler request comprises determining whether the request is a crawler request based on the header information.

9. The method of claim 7, further comprising:
obtaining web assets based on the request,
wherein causing the server-side renderer to generate the static page comprises causing the server-side renderer to generate the static page based on the web assets.

10. The method of claim 9, wherein obtaining the web assets comprises:
generating, via the server-side renderer, one or more application programming interface (API) calls for the web assets; and
obtaining, via the server-side render, the web assets from one or more databases in response to the API calls.

11. The method of claim 7, wherein the server-side renderer is caused to generate the static page in response to (i) determining that the request is a crawler request and (ii) determining that the request comprises an uniform resource locator for the single-page web application.

12. The method of claim 7, wherein generating the static page comprises:
obtaining a base page of the single-page web application;
obtaining one or more additional web assets related to the base page from one or more databases; and
generating, via the server-side renderer, the static page based on the base page of the single-page web application and the one or more additional web assets.

13. The method of claim 7, wherein the request comprises a reference to the single-page web application.

14. The method of claim 7, wherein the request is obtained via a crawler, and the static page is provided to the crawler as a response to the request.

15. A non-transitory computer-readable media comprising instructions that, when executed by one or more processors, cause operations comprising:
in response to determining that a request from a crawler comprising a reference related to a single-page web application is a crawler request, causing a server-side renderer to generate a
static page in connection with the request from the crawler by:
(i) obtaining, via the server-side renderer, web assets from one or more databases, and
(ii) generating, via the server-side renderer, the static page based on the web assets;
providing the static page as a first response to the request; and
in response to determining that a second request from a client device comprising a second reference related to the single-page web application is not a crawler request, providing web assets to be received by the client device in lieu of causing the server-side renderer to generate a corresponding static page.

16. The media of claim 15, the operations further comprising:
extracting header information from the request,
wherein determining whether the request is a crawler request comprises determining whether the request is a crawler request based on the header information.

17. The media of claim 15, the operations further comprising:
obtaining web assets based on the request,
wherein causing the server-side renderer to generate the static page comprises causing the server-side renderer to generate the static page based on the web assets.

18. The media of claim 17, wherein obtaining the web assets comprises:
generating, via the server-side renderer, one or more application programming interface (API) calls for the web assets; and
obtaining, via the server-side render, the web assets from one or more databases in response to the API calls.

19. The media of claim 15, wherein the server-side renderer is caused to generate the static page in response to (i) determining that the request is a crawler request and (ii) determining that the request comprises an uniform resource locator for the single-page web application.

20. The media of claim 15, wherein generating the static page comprises:
obtaining a base page of the single-page web application;
obtaining one or more additional web assets related to the base page from one or more databases; and
generating, via the server-side renderer, the static page based on the base page of the single-page web application and the one or more additional web assets.

* * * * *